April 18, 1933.  T. B. CLARK  1,903,957
WATER SOFTENING SYSTEM AND MEANS FOR CONTROLLING OPERATION THEREOF
Filed Feb. 21, 1927  2 Sheets-Sheet 1

Inventor
Thomas B. Clark
By Wilson & McCanna
Attys

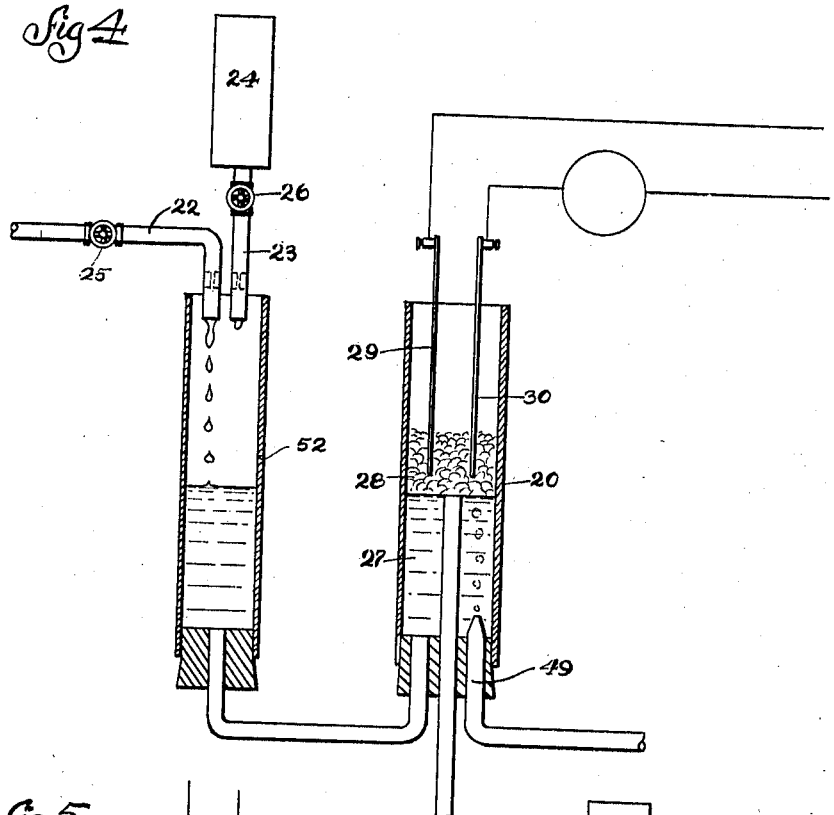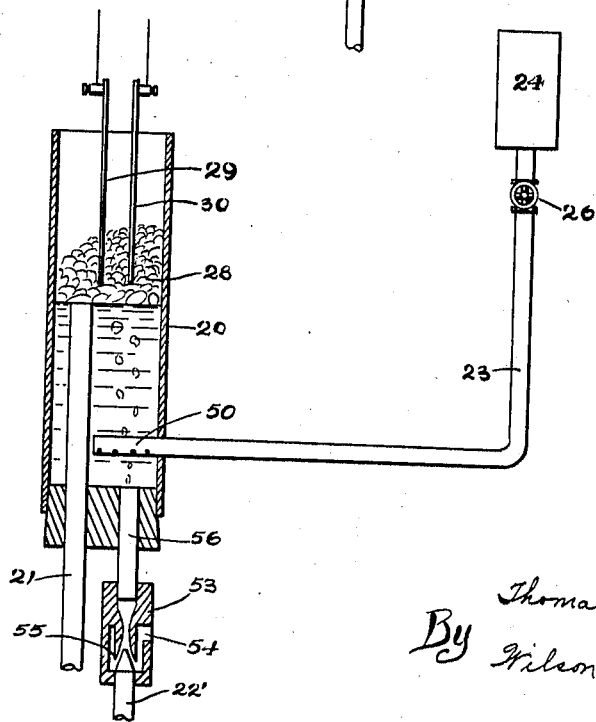

Patented Apr. 18, 1933

1,903,957

UNITED STATES PATENT OFFICE

THOMAS B. CLARK, OF ROCKFORD, ILLINOIS, ASSIGNOR, BY MESNE ASSIGNMENTS, TO THE PERMUTIT COMPANY, OF WILMINGTON, DELAWARE, A CORPORATION OF DELAWARE

WATER SOFTENING SYSTEM AND MEANS FOR CONTROLLING OPERATION THEREOF

Application filed February 21, 1927. Serial No. 169,827.

This invention relates to water softeners and in certain of its phases is particularly applicable to automatic or semi-automatic water softening systems.

The principal object of the present invention is to provide an improved water softening system and method and means for controlling the operation thereof by virtue of which the time of regeneration is determined, not by the usual method of metering the water flowing through the softener during the softening operation and causing the regeneration to occur after a predetermined amount of water has been passed through, but rather by detecting the hardness in the water issuing to the service system and causing regeneration to occur immediately, or as soon thereafter as is practicable, when the water has attained a certain degree of hardness.
According to the present invention a certain small amount of the water issuing from the softener during the softening operation is conducted to a suitable receptacle into which is also supplied a proper proportionate amount of soap solution, the proportioning being calculated to produce a copious lather when the water is relatively soft, but failing to produce lather when the water attains a certain predetermined degree of hardness whereby the necessity for regenerating the softener is indicated. In the case of an automatic water softening system I contemplate the use of electrical contacts which are arranged to have a circuit closed therebetween so long as the water is relatively soft, and to cause interruption of this circuit when the water has attained such hardness as to be incapable of further producing a lather in commingling with the soap solution.
The breaking of the circuit through the contacts is utilized to complete an auxiliary circuit and bring about the operation of the electric motor, or other electrically operated device, furnishing power to the valve operating mechanism of the softener. The time the regeneration is carried out may be controlled automatically, semi-automatically, or may be clock-controlled as is well known in this art. In the case of an ordinary hand-operated softener, it will be apparent that the breaking of the circuit through the contacts may be utilized in a visible or audible alarm of any suitable or preferred type in which case the operator, upon becoming aware of the necessity for regeneration, would put the softener through its regeneration at his convenience.

Another object of the present invention relates to the provision of a novel controller in the form of a testing apparatus where the water and the soap solution may be commingled in such a manner as to insure the formation of the telltale lather. The commingling of the water and soap solution, as hereinafter described, may be brought about simply by the mechanical agitation resulting from the dropping, flowing, or injecting of the water, or may be produced by the blowing or drawing of air bubbles through the water and soap solution, or by the injection of air with the injection of the water to be tested.

These and other objects, advantages, and uses of my invention will appear more clearly in the course of the following detailed description having reference to the accompanying drawings in which—

Figs. 3, 4, and 5 are modified or alternative forms of apparatus.

The same or similar reference numerals are applied to corresponding parts through the views.

Figure 1:
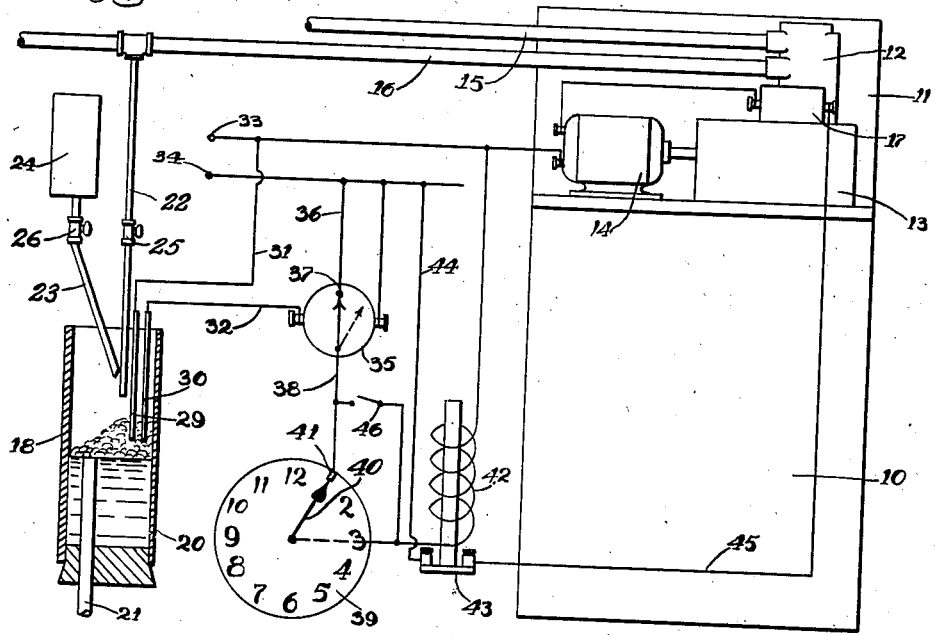
Figure 1 is a diagram of a water softening system embodying my invention, the system by reason of my invention being controlled in accordance with the novel method, hereinafter referred to, to operate automatically, semi-automatically or to be time-controlled as desired.

For the purposes of the present description I have illustrated my invention as applied to use in connection with an automatic water softener of the type shown in the patent of Harwood and Griswold, No. 1,846,418 of February 23, 1932, although, of course, the invention is not to be considered as limited to this special patent but may be used in connection with any type of water softener whether of the hand-controlled or automatic type, or intended for industrial or household use. The softener as described in said patent comprises, in a unitary casting, a softener compartment 10 and a brine tank compartment 11, the softener compartment having mounted thereon a valve 12, and a valve operating mechanism 13 with its electric motor 14. A pipe, indicated at 15, furnishes hard water from the city mains, or other source, to the softener through the valve 12, and a pipe 16 extends from the valve 12 to furnish soft water to the service system, the pipe 15 being in communication with the inlet end of the softener during normal softening operation, as fully set forth in said patent, and the pipe 16 being in communication with the outlet end thereof. The softener disclosed in said patent, in common with other automatic water softeners, has a meter for measuring the flow of water through the softener, the valve operating mechanism being operated by its electric motor after a predetermined amount of water has passed through the meter so as to shift the valve to the regenerating position. A make and break switch 17 is also provided in connection with the valve operating mechanism, as described in said patent, to break the circuit through the motor when the valve has been shifted through its proper angularity. In the present case I have eliminated the meter and provided a controller, indicated generally by the reference numeral 18, by means of which any hardness in the water issued to the service system from the softener through the pipe 16 may be detected and a circuit completed for the motor 14 to commence the regeneration of the softener when the water has attained a certain predetermined degree of hardness. The advantage in so controlling the operation of the softener is that there is no likelihood of the softener being allowed to exceed what should be its capacity run for as soon as the bed of softening material in the softener has become exhausted to such an extent as no longer to be capable of softening the water, the necessity for regeneration is at once made evident so that the operator may put the softener through its regeneration, or else the softener is automatically put through its regeneration at once or as soon as practicable, as may be predetermined by the setting of a control clock, as hereinafter described. Where the time of regeneration is determined simply by permitting only a predetermined amount of water to pass through the softener in what is termed a capacity run, the estimate of the quantity of water may be either too high or too low and, in any event, does not take into consideration a certain amount of variation in the hardness of water in a given locality from day to day, nor does it take into consideration the fact that the zeolite, or other water softening material, is supplied in numerous grades, qualities and grain sizes, possessing vastly different reactive capacities and also the fact that there will be some variation in the capacity of a given bed of water softening material after the same has been in service for some time. Obviously then, since the primary purpose of a water softener is to furnish water of a zero hardness or as close thereto as possible, it is of especial advantage to provide, as in the present case, for the reconditioning or regeneration of the softener whenever the water issuing from the outlet side thereof is no longer what may be regarded as soft water.

Figure 2:
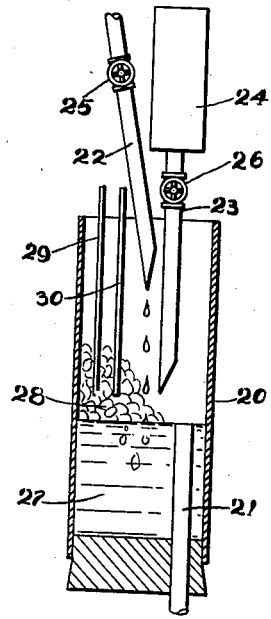
Fig. 2 is a rather diagrammatic view of the testing apparatus for detecting the hardness in the water issuing from the softener, this particular apparatus corresponding to that shown in Fig. 1.

Before proceeding further with the description of my improved system and method of operation, reference may be had to Fig. 2 wherein I have illustrated one form of apparatus for detecting hardness in the water issuing from the softener, that is, water which has been passed through the bed of water softening material. Briefly stated, this apparatus comprises a receptacle 20 having a constant level drain pipe 21 leading to the sewer, preferably by way of the drain pipe (not shown) extending from the softener. A constant level is thereby maintained while water is constantly supplied to the receptacle through a pipe 22 having communication with the service pipe 16, previously referred to. Soap solution is also supplied to the receptacle through a pipe 23 from a suitable reservoir 24. The water is regulated by a suitable valve 25 and the feeding of soap solution is regulated by a valve 26 so that the two are admitted in the proper proportions to form a rich lather in the receptacle 20 above the level of the body of liquid 27 therein. The agitation of the liquid by the incoming water from the pipe 22 insures the formation of the lather, indicated at 28, especially since the water is caused to drop immediately alongside the drops of soap solution. As will appear in a description of the other forms of apparatus shown in Figs. 3–5 inclusive, other means or methods of operation may be employed to insure the formation of a copious lather. A pair of contacts 29 and 30 extend into the receptacle 20 so that their free ends are immersed in the lather 28 so long as there is enough present. Obviously, as the water supplied through the pipe 22 gains in hardness it produces less and less lather upon commingling with the soap solution until finally when it has attained a certain degree of hardness there is no perceptible lather formed because the same proportioning of water to soap solution is maintained at all times and harder water requires more soap solution to produce a lather. Furthermore this hard water will break up and dissolve the lather previously formed with soft water. It will, therefore, appear that the contacts 29 and 30 have a circuit closed therebetween only so long as there is lather present in a sufficient amount, that is, when the water is relatively soft. As soon as the water has attained a certain degree of hardness the failure of the lather results in a breaking of the circuit between the two contacts. How this brings about the regeneration of the water softener will now be described.

Referring again to Fig. 1, the contacts 29 and 30 have conductors 31 and 32, respectively, connected therewith and with the line terminals 33 and 34 across which is impressed the usual 110 or 220 volts in a D. C. or A. C. circuit. A volt meter 35 is inserted in the circuit with the contacts and its needle is deflected, as indicated in dotted lines, so long as the circuit is closed at the contacts 29 and 30 by having the gap therebetween bridged by the lather. As soon as this circuit is broken, however, the needle swings back to its zero position and it then completes an auxiliary circuit through a conductor 36 at the contact 37. The needle has a suitable insulated connection with a conductor 38 and when the needle makes contact at 37 a circuit is completed through a clock 39, provided the hand 40 of the latter has come into position where it makes contact at 41. If the hand has not arrived at this position the time of regeneration, as will presently appear, is delayed until it does. The clock 39 is in series with a solenoid coil 42. Thus, when the circuit is completed at the contact 37 and at the contact 41, the relay switch 43 is closed and the following circuit is completed for the motor 14: From the terminal 34 through the conductor 44, switch 43, conductor 45, switch 17, and through motor 14 to the other terminal 33 of the line. The valve 12 is thereby shifted from its normal softening position to its regeneration position, whereupon the circuit is broken at the switch 17 and the motor stops. Any suitable provision may be made such as those described in the Harwood and Griswold patent, above referred to, for completing the circuit successively, first after the regeneration flow has been completed at which time the valve must be shifted to its back wash or flushing position, and then again at the close of the flushing operation at which time the valve must be shifted back to the normal softening position. If it is desired to employ a meter for measuring simply the amount of brine passed through during regeneration and the amount of flushing water passed through thereafter and to have the meter control the closing of the switch 17, as described in the Harwood and Griswold patent, this provision may be made. However, other means may be employed to accomplish the closing of the switch 17 at the end of the regeneration flow and at the end of the back wash flow. As above described, the time of regeneration would be governed entirely by the clock 39 so as to cause the regeneration the occur at some time during the day as, for example, at one or two o'clock in the morning when there is the least likelihood of the regeneration causing any inconvenience, having in mind that the service of the softener is usually interrupted during the interval of regeneration. If desired, however, the operation of the system may be entirely automatic or semi-automatic. For this purpose I provide a switch at 46 which is shunted across the clock 39 and is arranged to be operated manually. If this switch is closed at any time after the auxiliary circuit is completed by the volt meter 35, it is obvious that the motor 14 will be thrown into operation at once. Thus, the operator may bring about the regeneration at his convenience. This amounts to making the system semi-automatic in its operation. If the switch is left closed at all times, the system will be fully automatic in its operation since regeneration will occur as soon as the volt meter 35 closes the auxiliary circuit in the manner above described. If, on the other hand, the switch 46 is never closed and the operator simply sets the clock 39 to make contact at some certain hour of the day which he considers most desirable and convenient the operation of the system will obviously be time-controlled. Another switch may be provided to short circuit the volt meter and provide a direct connection between the conductors 36 and 38. In that case the closing of this switch and of the switch 46 would result in the closing of the circuit for the motor 14 and the operator would thus be enabled to bring about the regeneration entirely at will and independently of the controller 18.

Figure 3:
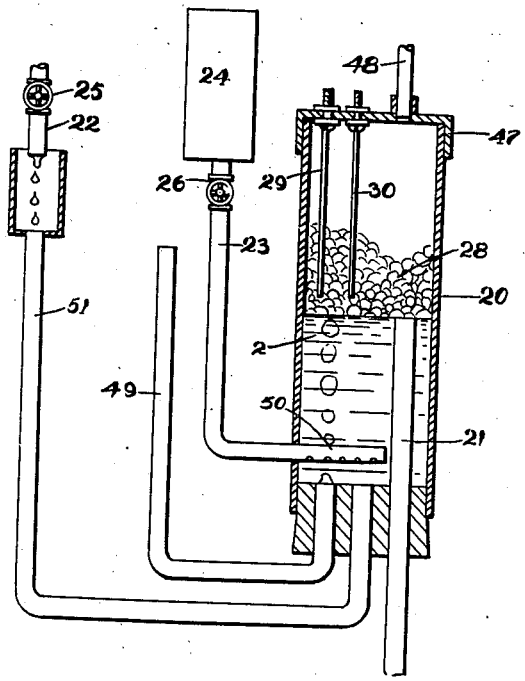

In the apparatus ilustrated in Fig. 3, the receptacle 20 is likewise equipped with an overflow or drain pipe 21 and is supplied with water from the pipe 22 and soap solution from the pipe 23. Provision is made in this case, however, for producing a reduction in pressure in the receptacle 20 and for this purpose a cap 47 is provided closing the upper end of the receptacle, and a tube 48 leading to a suitable source of suction, such as a smoke stack, chimney, or the like, is provided communicating with the inside of the receptacle. An air induction pipe 49 leads into the bottom of the receptacle 20 immediately beneath the perforated inlet end 50 of the pipe 23. The inlet for the pipe 51 which conducts the water to the receptacle is also immediately below the inlet end 50 of the pipe 23. Thus, the rising water and air coming in direct contact with the soap solution produces a rich lather 28 on the surface of the liquid in the receptacle.

In Fig. 4, the soap solution and the water are first mixed in a tube 52 before entering the receptacle 20 proper and are caused to enter the receptacle at the lower end thereof adjacent the inlet end of an air pipe 49, the latter having connection with a suitable source of air supply under pressure. The agitation of the body of liquid 27 insures the formation of a rich lather on the surface of the liquid about the contacts 29 and 30. This arrangement relying as it does upon the availability of air under pressure is suited only to factory installation and the like, whereas the forms shown in Figs. 2 and 3 are applicable to household installations or wherever it is not feasible to provide the air supply. The form of apparatus shown in Fig. 5 is also rather limited in its use since it contemplates an installation where large volumes of water are handled as, for example, in a laundry. In this case, the water pipe 22' leads into an injector nozzle 53 and air entering through an opening 54 is entrained at 55 with water as it is injected. The water and air enter through a pipe 56 immediately adjacent the perforated inlet end 50 of the pipe 23 through which the soap solution is supplied to the receptacle 20. This obviously brings about the formation of a rich lather at the contacts 29 and 30 similarly as with the other forms.

It is believed that the foregoing description conveys a clear understanding of my invention and of the many possible applications to which the same may be put. Involving, as it does, a departure from previous conventional methods of operating water softening systems, the invention is capable of considerable variation from the forms more or less diagrammatically illustrated in the present case. It is, therefore, the endeavor in the appended claims to embrace all legitimate modifications and adaptations of the invention which would naturally occur to one skilled in this art after a disclosure of the present invention.

I claim:

1. In a water softening system, the combination with a water softener and means for regenerating the same, of a controller governing the operation of said regenerating means, said controller comprising a receptacle, means for diverting water from the outlet or service side of the water softener into said receptacle in a suitable volume, means for supplying a soap solution to the water in said receptacle to form a lather, and means arranged to render said regenerating means operative, said means being itself rendered operative upon a failure of lather formation in said receptacle, but being otherwise maintained inoperative in the presence of the lather evidencing the relative softness of the water.

2. In a water softening system, the combination with a water softener and means for regenerating the same including an electrical device arranged to be placed into operation at the time of regeneration, of a controller governing the operation of said regenerating means, said controller comprising a receptacle, means for diverting water from the outlet or service side of the water softener in a suitable volume into said receptacle, means for supplying a soap solution in a proportionate volume to said receptacle to form a lather, and contacts in an electrical circuit arranged to be short circuited by the lather formed in said receptacle when the water tests relatively soft, said contacts being disposed in the same electrical system with the aforementioned electrical device and being arranged to complete a circuit therethrough when said contacts are no longer short circuited by lather when the water attains a certain degree of hardness whereby to commence the operation of said regenerating means.

3. A system as set forth in claim 2 wherein said circuit includes a contact making clock whereby to govern the time of regeneration, and a manually operable switch shunted across said clock whereby to permit placing the system into regeneration at any desired time.

4. In a water softening system, the combination with a water softener having means for regenerating the same, of means for continuously and automatically abstracting samples of the water issuing from said softener during the normal softening operation and likewise subjecting said water to a test for hardness, said means comprising a receptacle, a pipe for continuously supplying water thereto from the discharge side of the softener, and a pipe for continuously supplying testing material thereto, said receptacle having an overflow whereby a certain level of liquid is maintained therein, and means arranged to indicate when the water has attained a certain degree of hardness whereby to indicate the necessity for regeneration.

5. In a water softening system, the combination with a water softener having means for regenerating the same, of means for continuously abstracting samples of the water issuing from said softener during the normal softening operation, means for subjecting this water to a soap test to determine the degree of hardness thereof whereby to indicate by a failure to form a lather when the water attains a certain degree of hardness the necessity for regeneration of the softener, and means operable only when the water fails to form a lather in the soap test for rendering the first mentioned means operative.

6. In a water softening system, the combination with a water softener having means for regenerating the same, of means for continuously abstracting a small amount of water from the outlet or service side of the softener during regeneration, a receptacle to receive this water and arranged to have a predetermined amount of water maintained therein, means for supplying a soap solution to the receptacle in a proper proportion to the feeding of the water thereto so as to form a lather therein when the water is relatively soft, contacts in said receptacle arranged to have a circuit completed therebetween by the lather, and an electrical instrument inserted in circuit with said contacts whereby to indicate when the lather is no longer formed in said receptacle so as thereby to indicate the necessity for regeneration.

7. In a system as set forth in claim 6 wherein said electrical instrument has a movable needle arranged when the circuit through said contacts is interrupted to complete an auxiliary circuit, the provision of electrically operated means arranged to be placed into operation upon the closing of said auxiliary circuit whereby to commence the regeneration of the softener.

8. In a system as set forth in claim 6 wherein said electrical instrument has a movable needle arranged when the circuit through said contacts is interrupted to complete an auxiliary circuit, the provision of a clock electrically connected in said auxiliary circuit and arranged to determine the time of regeneration, and electrically operated means arranged to be placed into operation at the predetermined time to put the softener through its regeneration.

9. In a system as set forth in claim 6 wherein said electrical instrument has a movable needle arranged when the circuit through said contacts is interrupted to complete an auxiliary circuit, the provision of a switch in said auxiliary circuit arranged to be manually operated to determine the time of regeneration, and electrically operated means arranged to be placed into operation upon the closing of said last mentioned switch to put the softener through its regeneration.

10. In a system as set forth in claim 6 wherein said electrical instrument has a movable needle arranged when the circuit through said contacts is interrupted to complete an auxiliary circuit, the provision of a clock electrically connected in said auxiliary circuit and arranged to predetermine the time of regeneration, a switch shunted about said clock in said circuit and arranged to be manually operated to permit regeneration to occur at some other desired time, and electrically operated means arranged to be placed into operation either at the time predetermined by said clock or by the closing of said last mentioned switch at some other time to put the softener through its regeneration.

11. In a water softening system comprising a water softener having a hard water inlet and a soft water outlet, means arranged during the normal softening operation to continuously conduct a sample stream of water from the outlet side of said softener to a suitable receptacle, means for continuously supplying soap solution in a proper proportionate amount to form a lather with said water when the same is relatively soft whereby to indicate by a failure of the commingling water and soap solution to form a lather the necessity for regenerating said softener, and means for continuously causing agitation of the mixture of water and soap solution to insure lathering when the water is soft.

12. In a system as set forth in claim 11, the provision of electrical contacts arranged to have a circuit completed therebetween by the lather formed by the commingling of the water and soap solution, and means in circuit with said contacts for indicating whether the circuit therebetween is closed or open.

13. In a system as set forth in claim 11, the provision of electrical contacts arranged to have a circuit completed therebetween by the lather formed by the commingling of the water and soap solution, and electrical means controlled by the breaking of the circuit between said contacts to commence the regeneration of the softener.

14. In a water softening apparatus, the combination with a softener, and electrically operated means for controlling the flow of water therethrough during the softening function and regeneration function, of an electrical soap test unit for testing the water discharged from the softener during the softening function arranged to throw the last mentioned means into operation to commence the regeneration function when the water discharged fails to give a good soap test.

15. A structure as set forth in claim 1 including means for insuring good mixing of the water and the soap solution to form a lather so long as the water is soft.

16. A structure as set forth in claim 1 wherein the means for diverting water from the service side of the softener to the receptacle and the means for supplying a soap solution are so related at the receptacle as to insure good contact of the water with the soap solution to form a lather so long as the water is soft.

In witness of the foregoing I affix my signature.

THOMAS B. CLARK.